United States Patent
Maag

(10) Patent No.: US 9,332,730 B2
(45) Date of Patent: May 10, 2016

(54) LIVESTOCK OILING AND SCRATCHING DEVICE

(71) Applicant: David Maag, Wallace, SD (US)

(72) Inventor: David Maag, Wallace, SD (US)

(*) Notice: Subject to any disclaimer, the term of this patent is extended or adjusted under 35 U.S.C. 154(b) by 219 days.

(21) Appl. No.: 14/252,834

(22) Filed: Apr. 15, 2014

(65) Prior Publication Data

US 2015/0289480 A1 Oct. 15, 2015

(51) Int. Cl.
*A01K 13/00* (2006.01)

(52) U.S. Cl.
CPC .............. *A01K 13/004* (2013.01); *A01K 13/003* (2013.01)

(58) Field of Classification Search
CPC .... A01K 13/00; A01K 13/003; A01K 13/004
USPC ......... 119/600, 602, 603, 650, 652, 656, 658, 119/659, 660, 666
See application file for complete search history.

(56) References Cited

U.S. PATENT DOCUMENTS

| | | | |
|---|---|---|---|
| 2,581,028 A | 1/1952 | Kirk | |
| 2,641,225 A | 6/1953 | Kirk | |
| 2,688,950 A | 9/1954 | McKinley | |
| 2,777,421 A * | 1/1957 | Hiebert | A01K 13/004 119/61.57 |
| 2,810,369 A | 10/1957 | Assman et al. | |
| 2,825,305 A * | 3/1958 | Tatge | A01K 13/004 119/660 |
| 2,892,448 A * | 6/1959 | Merwin | A01K 13/004 119/656 |
| 2,956,543 A | 10/1960 | Kirk | |
| 2,982,251 A | 5/1961 | Krogman | |
| 3,062,187 A * | 11/1962 | Piel | A01K 13/004 119/658 |
| 3,116,717 A * | 1/1964 | Ragsdale | A01K 13/003 119/652 |
| 3,159,144 A * | 12/1964 | Duncan | A01K 13/004 119/652 |
| 3,202,132 A * | 8/1965 | Lentz | A01K 13/004 119/652 |
| 3,238,924 A * | 3/1966 | Fillbach | A01K 13/004 119/660 |
| 3,538,891 A * | 11/1970 | Williams | A01K 13/004 119/658 |
| 3,831,559 A * | 8/1974 | Hinrichs | A01K 13/004 119/657 |
| 3,913,530 A | 10/1975 | Smith | |
| 4,091,767 A * | 5/1978 | Montgomery | A01K 13/003 119/652 |
| 4,748,939 A * | 6/1988 | Cocke, Jr. | A01K 13/003 119/660 |
| 4,870,926 A | 10/1989 | Smith | |
| 5,027,747 A * | 7/1991 | Talley | A01K 13/003 119/652 |
| 6,557,493 B2 * | 5/2003 | Cortner, Jr. | A01K 13/003 119/651 |
| 7,267,079 B1 * | 9/2007 | Larson | A01K 13/003 119/658 |
| 8,006,647 B2 * | 8/2011 | Raber | A01K 13/002 119/603 |
| 8,833,308 B1 * | 9/2014 | Patterson | A01K 13/003 119/484 |
| 2009/0031965 A1 * | 2/2009 | Campbell | A01K 13/003 119/652 |
| 2013/0305998 A1 * | 11/2013 | Brown | A01K 13/001 119/603 |

* cited by examiner

*Primary Examiner* — Monica Williams
*Assistant Examiner* — Michael Wang

(57) ABSTRACT

A livestock oiling and scratching device facilitates dispensing of oil and insecticide onto livestock as the livestock rubs against the device. The device includes a base and a pole coupled to the base. A reservoir for holding a fluid is coupled to the pole proximate an upper end of the pole. A cable is coupled to and extends between the pole and the base. A top section of the cable is in fluid communication with the reservoir wherein the cable is impregnated by the fluid. The cable extends through each of a plurality of tubes and discs. Each of the discs is positioned between an associated adjacent pair of the tubes. A circumferential edge of each disc is positioned in outwardly spaced relationship to the associated adjacent pair of the tubes.

14 Claims, 4 Drawing Sheets

LIVESTOCK OILING AND SCRATCHING DEVICE

BACKGROUND OF THE DISCLOSURE

Field of the Disclosure

The disclosure relates to livestock oiling devices and more particularly pertains to a new livestock oiling device for facilitating dispensing of oil and insecticide onto livestock as the livestock rubs against the device.

SUMMARY OF THE DISCLOSURE

An embodiment of the disclosure meets the needs presented above by generally comprising a base and a pole coupled to the base. A reservoir for holding a fluid is coupled to the pole proximate an upper end of the pole. A cable is coupled to and extends between the pole and the base. A top section of the cable is in fluid communication with the reservoir wherein the cable is impregnated by the fluid. The cable extends through each of a plurality of tubes and discs. Each of the discs is positioned between an associated adjacent pair of the tubes. A circumferential edge of each disc is positioned in outwardly spaced relationship to the associated adjacent pair of the tubes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
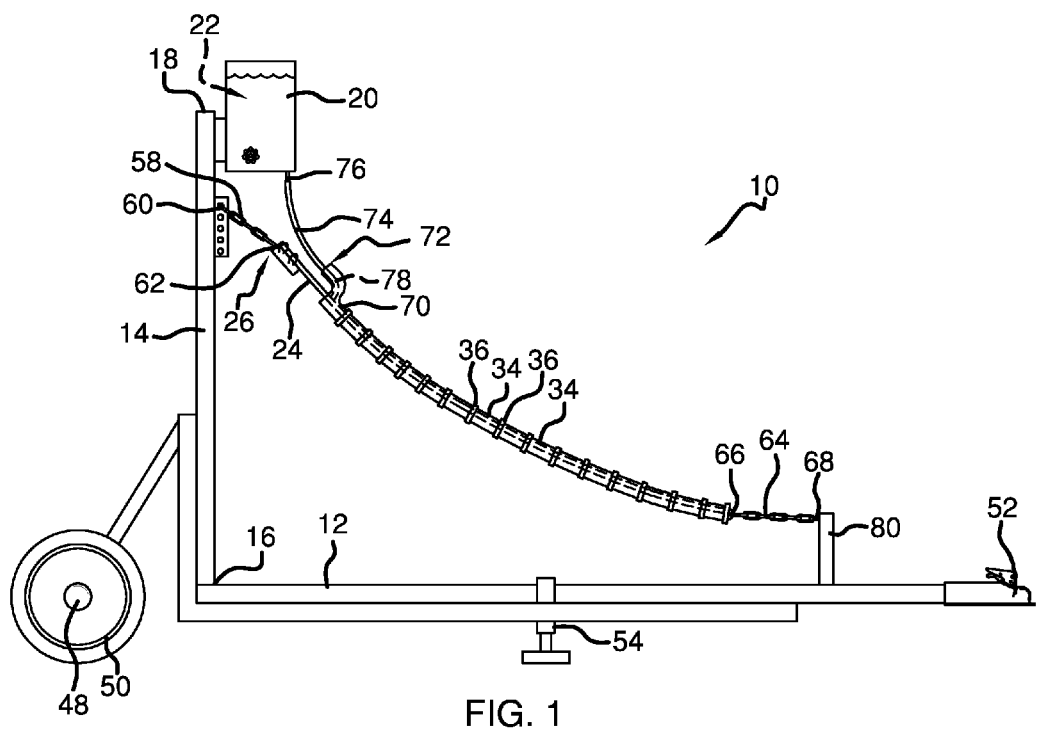
FIG. 1 is a side view of a livestock oiling and scratching device according to an embodiment of the disclosure.
Figure 2:
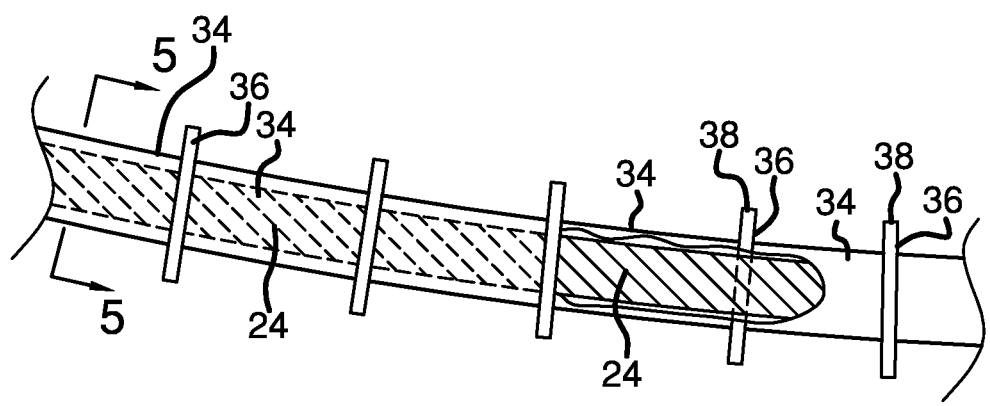
FIG. 2 is a partial cut-away detailed side view of an embodiment of the disclosure.
Figure 3:
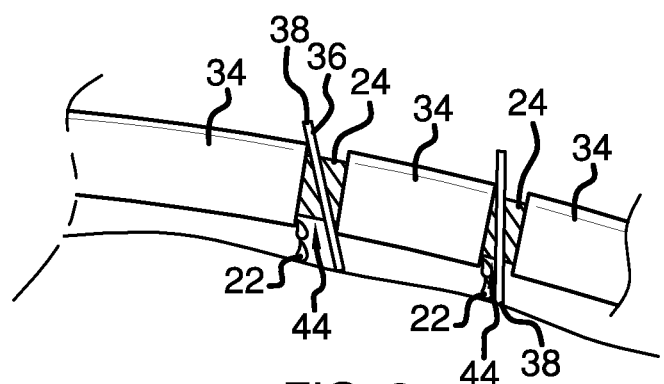
FIG. 3 is a detailed side view of an embodiment of the disclosure in use.

With reference now to the drawings, and in particular to FIGS. 1 through 6 thereof, a new livestock oiling device embodying the principles and concepts of an embodiment of the disclosure and generally designated by the reference numeral 10 will be described.

As best illustrated in FIGS. 1 through 6, the livestock oiling and scratching device 10 generally comprises a base 12 and a pole 14 coupled to the base 12. The pole 14 has a base end 16 and an upper end 18. A reservoir 20 is coupled to the pole 14 proximate the upper end 16. The reservoir 20 is configured for holding a fluid 22. The fluid 22 is of a conventional type used for treating livestock to deliver oil and/or insecticide to the livestock. A cable 24 is coupled to and extends between the pole 14 and the base 12. The cable 24 has a top section 26 and a bottom end 28. The cable 24 is constructed of a plurality of wound metal fibers 30 allowing the fluid 22 to permeate and pass through the cable 24. The top section 26 of the cable 24 is in fluid communication with the reservoir 20 wherein the cable is configured for is impregnated by the fluid 22. The cable 24 hangs between the pole 14 and the base 12 such that the cable 24 forms an arc 32 between the top section 26 of the cable 24 and the bottom end 28 of the cable 24.

Figure 4:
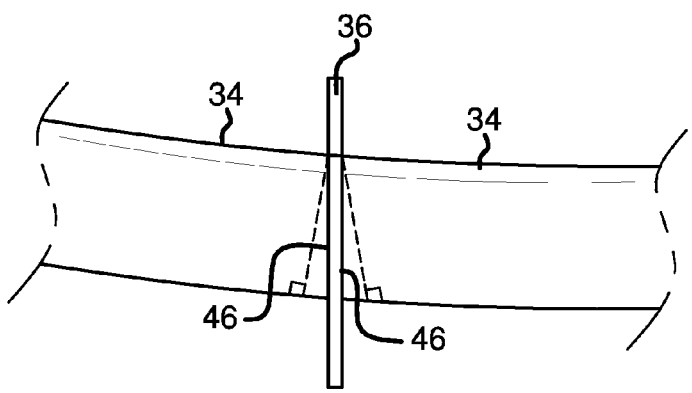
FIG. 4 is a detailed exaggerated side view of an embodiment of the disclosure.
Figure 5:
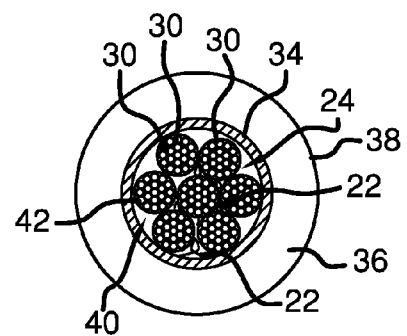
FIG. 5 is a cross-sectional view of an embodiment of the disclosure taken along line 5-5 of FIG. 2.
Figure 6:
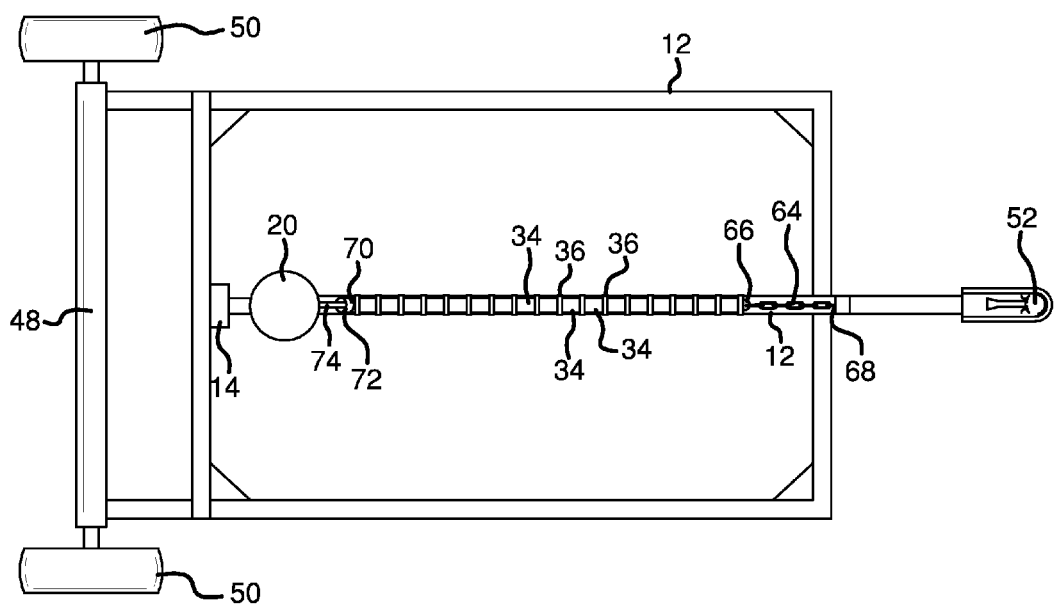
FIG. 6 is a top view of an embodiment of the disclosure.

Each of a plurality of tubes 34 is provided. The cable 24 extends through each of the tubes 34. The cable 24 further extends through each of a plurality of discs 36. Each of the discs 36 is positioned between an associated adjacent pair of the tubes 34. Each of the discs 36 has a radius greater than a radius of each of the tubes 34 wherein a circumferential edge 38 of each disc 36 is positioned in outwardly spaced relationship to the associated adjacent pair of the tubes 34. The tubes 34 and the discs 36 cover the cable 24 from the top section 26 to the bottom end 28. Each of the discs 36 has a central aperture 40 having a diameter greater than an outer diameter 42 of the cable 24 wherein each disc 36 is pivotable into a skewed position relative to a longitudinal axis of the cable 24. Thus, the disc 36 urges the adjacent pair of tubes 34 apart defining a gap 44 between the adjacent pair of tubes 34 whereby each disc 36 is configured for facilitating dispensing of the fluid 22 through the gap 44 onto livestock rubbing against the discs 36. Each of the tubes 34 may be constructed of a wearable aluminum material such that each end 46 of the tube 34 wears to conform to angling between each end 46 of the tube 34 and a respective adjacently positioned one of the discs 36, as shown in FIG. 4. The angling of the ends 46 of the tubes 34 allows for collection of the fluid within the tubes 34 until the discs 36 are moved by livestock rubbing against the tubes 34 and discs 36 on the cable 24.

An axle 48 may be coupled to the base 12. Each of a pair of wheels 50 is coupled to the axle 48 and a hitch 52 is coupled to the base 12 opposite the axle 48 wherein the base 12 is configured for being transported by a vehicle coupled to the hitch 52. A leg 54 is coupled to the base 12. The leg 54 is positioned between the axle 48 and the hitch 52. The leg 54 is extendable to support the base 12 with the wheels 50.

An upper chain section 58 has a first end 60 coupled to the pole 14. The upper chain section 58 has a second end 62 coupled to the cable 24. A lower chain section 64 has a first end 66 coupled to the cable 24. The lower chain section 64 has a second end 68 coupled to the base 12. The upper chain section 58 and lower chain section 64 enhance durability of the device 10. A post 80 may be provided coupled to and extending upwardly from the base 12. The bottom end 28 of the cable 24, by way of the lower chain section 64, is coupled to the post 80. The pole 14 has a length greater than the post 80 wherein the cable 24 extends downwardly from the pole 14 to the post 80.

A collar 70 is coupled to the upper section 26 of the cable 24 such that the cable 24 extends through the collar 70. An aperture 72 extends into the collar 70. A tube 74 has a top end 76 in fluid communication with the reservoir 20. The tube 74 has a bottom end 78 in fluid communication with the aperture 72 wherein the tube 74 is configured to deliver the fluid 22 from the reservoir 20 to the upper section 26 of the cable 24.

In use, the device 10 functions similarly to a conventional livestock oiling apparatus. The discs 36 and tubes 34 provide pooling of the fluid 22, durability for the device 10, and the extension of the discs 36 from the tubes 34 provides a scratching effect such that the livestock are attracted to and readily utilize the device 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A livestock oiling and scratching device comprising:
a base;
a pole coupled to said base, said pole having a base end and an upper end;
a reservoir coupled to said pole proximate said upper end, said reservoir being configured for holding a fluid;
a cable coupled to and extending between said pole and said base, said cable having a top section and a bottom end, said top section of said cable being in fluid communication with said reservoir wherein said cable is configured for being impregnated by the fluid;
a plurality of tubes, said cable extending through each of said tubes; and
a plurality of discs, said cable extending through each of said discs, each of said discs being positioned between an associated adjacent pair of said tubes, each of said discs having a radius greater than a radius of each of said tubes wherein a circumferential edge of each said disc is positioned in outwardly spaced relationship to said associated adjacent pair of said tubes, each of the discs having a central aperture, said central aperture having a diameter greater than an outer diameter of said cable wherein each said disc is pivotable into a skewed position relative to a longitudinal axis of said cable such that said disc urges said adjacent pair of tubes apart defining a gap between said adjacent pair of tubes whereby each disc is configured for facilitating dispensing of the fluid through said gap onto livestock rubbing against said discs.

2. The device of claim 1, further comprising said tubes and said discs covering said cable from said top section to said bottom end.

3. The device of claim 1, further comprising said cable hanging between said pole and said base such that said cable forms an arc between said top section of said cable and said bottom end of said cable.

4. The device of claim 1, further comprising each of said tubes being constructed of aluminum material wherein each end of said tube wears to conform to angling between each said end of said tube and a respective adjacently positioned one of said discs.

5. The device of claim 1, further comprising said cable being constructed of a plurality of wound metal fibers.

6. The device of claim 1, further comprising:
an axle coupled to said base; and
a pair of wheels coupled to said axle.

7. The device of claim 6, further comprising a hitch coupled to said base opposite said axle wherein said base is configured for being transported by a vehicle coupled to said hitch.

8. The device of claim 7, further comprising a leg coupled to said base, said leg being positioned between said axle and said hitch, said leg being extendable to support said base with said wheels.

9. The device of claim 1, further comprising an upper chain section, said upper chain section having a first end coupled to said pole, said upper chain section having a second end coupled to said cable.

10. The device of claim 1, further comprising a lower chain section, said lower chain section having a first end coupled to said cable, said lower chain section having a second end coupled to said base.

11. The device of claim 1, further comprising:
a collar coupled to said upper section of said cable such that said cable extends through said collar;
an aperture extending into said collar; and
a tube having a top end in fluid communication with said reservoir, said tube having a bottom end in fluid communication with said aperture wherein said tube is configured to deliver the fluid from said reservoir to said upper section of said cable.

12. The device of claim 1, further comprising a post coupled to and extending upwardly from said base, said bottom end of said cable being coupled to said post.

13. The device of claim 12, further comprising said pole having a length longer than said post.

14. A livestock oiling and scratching device comprising:
a base;
a pole coupled to said base, said pole having a base end and an upper end;
a reservoir coupled to said pole proximate said upper end, said reservoir being configured for holding a fluid;
a cable coupled to and extending between said pole and said base, said cable having a top section and a bottom end, said cable being constructed of a plurality of wound metal fibers, said top section of said cable being in fluid communication with said reservoir wherein said cable is configured for being impregnated by the fluid, said cable hanging between said pole and said base such that said cable forms an arc between said top section of said cable and said bottom end of said cable;
a plurality of tubes, said cable extending through each of said tubes;
a plurality of discs, said cable extending through each of said discs, each of said discs being positioned between an associated adjacent pair of said tubes, each of said discs having a radius greater than a radius of each of said tubes wherein a circumferential edge of each said disc is positioned in outwardly spaced relationship to said associated adjacent pair of said tubes, said tubes and said discs covering said cable from said top section to said bottom end, each of said discs having a central aperture, said central aperture having a diameter greater than an outer diameter of said cable wherein each said disc is pivotable into a skewed position relative to a longitudinal axis of said cable such that said disc urges said adjacent pair of tubes apart defining a gap between said adjacent pair of tubes whereby each disc is configured for facilitating dispensing of the fluid through said gap onto livestock rubbing against said discs, each of said tubes being constructed of aluminum material wherein each end of said tube wears to conform to angling between each said end of said tube and a respective adjacently positioned one of said discs;

an axle coupled to said base;

a pair of wheels coupled to said axle;

a hitch coupled to said base opposite said axle wherein said base is configured for being transported by a vehicle coupled to said hitch;

a leg coupled to said base, said leg being positioned between said axle and said hitch, said leg being extendable to support said base with said wheels;

an upper chain section, said upper chain section having a first end coupled to said pole, said upper chain section having a second end coupled to said cable;

a lower chain section, said lower chain section having a first end coupled to said cable, said lower chain section having a second end coupled to said base;

a collar coupled to said upper section of said cable such that said cable extends through said collar;

an aperture extending into said collar;

a tube having a top end in fluid communication with said reservoir, said tube having a bottom end in fluid communication with said aperture wherein said tube is configured to deliver the fluid from said reservoir to said upper section of said cable; and a post coupled to and extending upwardly from said base, said bottom end of said cable being coupled to said post, said pole having a length longer than said post.

* * * * *